United States Patent [19]

Santilli

[11] 4,364,857
[45] Dec. 21, 1982

[54] FIBROUS CLAY MIXTURES

[75] Inventor: Donald S. Santilli, Pinole, Calif.

[73] Assignee: Chevron Research Company, San Francisco, Calif.

[21] Appl. No.: 224,713

[22] Filed: Jan. 12, 1981

[51] Int. Cl.³ .......................... B01J 20/12; B01J 21/16
[52] U.S. Cl. ................................ 252/455 R; 252/458; 252/459
[58] Field of Search ........................... 252/449, 455 R

[56] References Cited

U.S. PATENT DOCUMENTS

| | | | |
|---|---|---|---|
| 3,049,449 | 8/1962 | Allegrini | 252/449 X |
| 3,891,541 | 6/1975 | Bleck et al. | 208/89 |
| 3,966,641 | 6/1976 | Csatar et al. | 252/449 |
| 4,098,676 | 7/1978 | Robson | 252/455 R |
| 4,152,250 | 5/1979 | Inooka et al. | 208/251 H |
| 4,166,026 | 8/1979 | Fukui et al. | 208/210 |

Primary Examiner—Carl F. Dees
Attorney, Agent, or Firm—D. A. Newell; S. R. LaPaglia; C. L. Hartman

[57] ABSTRACT

A porous, ceramic composition suitable for use as a catalyst support for demetalation of asphaltene-containing feedstocks is made from a combination of fibrous clays, wherein the fibers of both clays are randomly dispersed and the resulting mass extruded and calcined. The first fibrous clay is preferably halloysite and the second fibrous clay is preferably attapulgite.

21 Claims, No Drawings

FIBROUS CLAY MIXTURES

BACKGROUND OF THE INVENTION

This invention relates to porous, ceramic compositions. In particular, this invention relates to compositions suitable for catalyst supports for the conversion of hydrocarbonaceous feedstocks. More particularly, this invention relates to hydroprocessing catalyst supports comprising mixtures of the fibrous clays halloysite and attapulgite.

Many hydrocarbon fractions such as crude petroleum, topped crudes, petroleum residua, bitumen, coal and shale oils and the like contain a substantial amount of contaminants such as sulfur, nitrogen and metals, especially nickel, iron, and vanadium. Such heavy fractions also typically contain substantial amounts of asphaltenes.

In the prior art contaminated heavy oil fractions have been upgraded by hydroprocessing in order to remove the metals, sulfur, and nitrogen, but the presence of asphaltenes in the oil often has an adverse effect on the activity of the conventional hydroprocessing catalyst. When large concentrations of metals are present in the oil they tend to deposit rapidly on the catalyst surface and plug pores of conventional hydroprocessing catalysts, with a consequent loss of catalytic activity and shortened lift of catalyst life.

SUMMARY OF THE INVENTION

This invention provides a catalyst support and a catalyst composition which have a large pore volume in 200–700 Angstroms diameter pores. It also provides such a support prepared by conventional forming techniques. It further provides methods for making and using such catalysts.

In one embodiment of this invention a catalyst is prepared by (a) preparing a mix of a first fibrous clay and a second fibrous clay, the first fibrous clay having predominantly rods having a length within the range of 0.5–2 microns and a diameter within the range of 0.04–0.2 microns, and the second fibrous clay having predominantly rods having a length within the range of 1–5 microns and a diameter within the range of 50–100 Angstroms, (b) adding sufficient liquid to said mix to form a slurry of no more than 25 percent solid, and then vigorously agitating the slurry to substantially disperse the rods, (c) removing enough water from the slurry to form an easily shapable mass, shaping the mass, and (d) drying and calcining the shaped body. It is preferred that the tubular form of halloysite be used as the first fibrous clay and attapulgite be used as second fibrous clay.

In its composition of matter aspects, this invention comprises codispersed rods of a first fibrous clay and a second fibrous clay, the first fibrous clay composed predominantly of fibers with a length range of 0.5–2 microns and a diameter range of 0.04–0.2 microns and a second fibrous clay predominantly composed of rods having a length range of 1–5 microns and a diameter range of 50–100 Angstroms. A preferred first clay is the tubular form of the clay halloysite and a preferred second clay is fibrous attapulgite. It is preferred that the composition be at least 5 percent attapulgite. It is preferred that the composition contain up to 15 percent of a binding refractory inorganic oxide. It is preferred that the refractory inorganic oxide be alumina. It is preferred that the catalyst body have a total pore volume of at least 0.35 cc/g and at least 60 percent of the volume of the pores is present in pores having diameters of 200–700 Angstroms. It is preferred that the composition also include at least one metal selected from the transition metals. This invention also comprises a method for hydroprocessing hydrocarbonaceous feedstocks comprising contacting the feedstocks with molecular hydrogen under hydroprocessing conditions in the presence of a catalyst having codispersed rods of a first fibrous clay having rods predominantly in the range of 0.5–2 microns with a diameter range of 0.04–0.2 microns and a second fibrous clay having rods in the range of 1–5 microns and a diameter range of 50–100 Angstroms. It is preferred that the first fibrous clay be halloysite and the second clay be attapulgite.

DETAILED DESCRIPTION

The clay halloysite is readily available from natural deposits. It can also be synthesized, if desired. In its natural state, halloysite often comprises bundles of tubular rods or needles consolidated or bound together in weakly parallel orientation. These rods have a length range of about 0.5–2 microns and a diameter range of about 0.04–0.2 microns. Halloysite rods have a central co-axial hole approximately 100–300 Angstroms in diameter forming a scroll-like structure.

It has been found that halloysite can make a suitable catalyst for use in demetalizing and hydroprocessing asphaltenes. The halloysite is processed to break up the bundles of rods so that each rod is freely movable with respect to the other rod. When substantially all the rods are freely movable with respect to all the other rods, the rods are defined herein as "dispersed". When the dispersed rod clay is dried and calcined, the random orientation of the rods provides pores of an appropriate size for hydroprocessing and hydrodemetalizing asphaltene fractions.

When halloysite rods or other rods of similar dimensions are agitated in a fluid such as water to disperse the rods, the dispersion can be shaped, dried and calcined to provide a porous body having a large pore volume present as 200–700 Angstroms diameter pores. When the shaping is by extrusion, however, it has been found that mixtures of dispersed clay rods of the halloysite type, do not extrude well. The rods on the surface of the extruded bodies tend to realign, destroying the desirable pore structure at the surface of the catalyst. This is defined herein as a "skin effect". It has been discovered, however, that if a second fibrous clay with longer, narrower and presumably more flexible, fibers is codispersed with the halloysite-type clay, the resulting composition is easily extrudible, and there is no significant skin effect. "Codispersed" is defined herein as having rod- or tube-like clay particles of at least two distinct types substantially randomly oriented to one another.

The second fibrous clay should have long slender fibers typically about 1–5 microns in length with a diameter range of about 50–100 Angstroms. Clays for use as the second component include attapulgite, crysotile, immogolite, palygorskite, sepiolite and the like.

The composition of the present invention is prepared by vigorously agitating a mix comprising the first fibrous clay and a second fibrous clay in a liquid dispersing medium. Water is a satisfactory dispersing agent. It is preferred that the slurry contain no more than 25 weight percent of total solids. The vigorous agitation can be accomplished in any suitable manner. In the laboratory, excellent codispersions are achieved with a Waring blender. It is observed that the slurry thickens with agitation, apparently due to the rods dispersing. Agitation is continued until the slurry maintains a constant thickness. Excess water is removed by slow evaporation at 110° C. until a workable plastic mass is formed. The mass can be shaped, using well known techniques such as extrusion, pelletizing, or spheredizing to form catalyst bodies. The shaped particles are then calcined at 500° C.

To increase the crush strength of the catalyst support, a refractory inorganic binder oxide such as alumina, silica, boria, titania, magnesia, or the like can be added to the composition. Preferably, the finished catalyst support contains less than about 15 weight percent binder oxide, based on the total weight of clay plus binder oxide. An especially preferable inorganic oxide range is about 3-7 percent by weight of the support.

If an inorganic oxide component is to be present into the composition of the present invention, codispersal of the rods of the fibrous clay is preferably carried out in the presence of an aqueous hydrogel or the sol precursor of the inorganic oxide gel component. The preferred inorganic oxide is alumina. Mixture of two or more inorganic oxides are suitable for the present invention for example, silica and alumina.

A function of the inorganic oxide gel component is to act as a bonding agent for holding or bonding the clay rods in a rigid, three-dimensional matrix. The resulting rigid skeletal framework provides a catalyst body with high crush strength and attrition resistance.

The catalyst may also include one or more catalytically active metals, such as transition metals. A first preferred group of catalytically active metals for use in catalysts of this invention, is the group of chromium, molybdenum, tungsten and vanadium. A second preferred group of catalytically active metals is the group of iron, nickel, and cobalt. Preferably, one or more of the metals of the first group is present in the catalyst at a total amount as metal of about 0.1-10 weight percent and one or more of the metals of the second group is present at a total amount as metal of from about 0.1-10 weight percent, based on the total catalyst weight. Especially preferred combinations include between 0.1 and 10 weight percent of at least one metal from both the first and second preferred groups, for example, molybdenum and cobalt, molybdenum and nickel, tungsten and nickel, and vanadium and nickel.

The metal component can be added to the catalyst composition at any stage of the catalyst preparation by any conventional metal addition step. For example, metals or metal compounds can be added to the slurry as solids or in solution, preferably before dispersion of the clay rods. Alternatively, an aqueous solution of metal can impregnate the dried or calcined bodies. The metals can be present in reduced form or as one or more metal compounds such as oxides or sulfides. One preferred method is impregnating the calcined catalyst bodies with a solution of phosphomolybdic acid and nickel nitrate.

The catalyst support may be employed for a wide variety of hydrocarbonaceous feedstock conversions, such as catalytic cracking, reforming, isomerization, alkylation, and the various types of hydroprocessing such as hydrocracking, hydrodesulfurization, hydrodenitrification, hydrodemetalation, hydrotreating, hydrofining, and hydrofinishing. The preferred application is hydroprocessing when catalytic metal from Group VII and/or Group VIII of the Periodic Table is included in the catalyst. Other metals that are conventionally used can be present for other applications. The catalyst of the invention is particularly useful for heavy oils hydroprocessing, such as crude oil, petroleum atmospheric or vacuum distillation residuum, coke redistillate oils, heavy petroleum oils, synthetic oils or fractions of synthetic oils such as bitumen, coal liquefaction products, shale oil, or the like. Heavy oils are not the only preferred feeds, however, since the present catalyst can be effectively used for demetalizing lighter oils. Asphaltenes are defined herein as the heavy hydrocarbonaceous material that is insoluble in n-heptane whether or not it is soluble in benzene. Asphaltenes typically contain significant amounts of various impurities, in particular, metals such as iron, nickel and vanadium and other non-metallic impurities such as sulfur and nitrogen. Especially suitable feeds are oils containing more than ten parts per million weight of metals such as nickel and vanadium. Asphaltic fractions, that is oils containing one weight percent or more of asphaltenes, are suitable feedstocks for the present invention, and feedstocks with particularly high asphaltene content, for example, 10 weight percent or more, are especially suitable for hydroprocessing with the catalyst of this invention.

Generic hydrogen treating conditions include reactions in temperature range of about 200°-540° C., a total pressure in the range of from about 1 atmosphere to about 300 atmospheres with hydrogen partial pressure up to about 200 atmospheres, a hydrogen to oil feed ratio up to 9,000 standard cubic liters per liter of oil (SCLL), and a liquid hourly space velocity (LHSV) of about 0.1 to about 25 reciprocal hours.

The catalyst of the present invention has a desirable pore volume for asphaltene hydroprocessing. It is preferable that a hydroprocessing and hydrodemetalation catalyst suitable for asphaltenes have a significant amount of its pore volume having pores greater than 200 Angstroms, because of the tendency of the metals of the asphaltenes to deposit on the surface of the catalyst and because of the physical size of many of the molecules comprising the asphaltene fraction. The pore volume of the present catalyst and the support from which it is made is at least about 0.35 cc/gram and at least 60 percent of the pore volume of the pores is present in pores having diameters of 200-700 Angstroms. Pore distributions are obtained by nitrogen desorption or mercury intrusion porosimetry. Reaction conditions in hydrodemetalation asphaltenes cracking preferably include the temperature in a range from about 200° C. to about 500° C., the hydrogen pressure of about 220-300 atmospheres, and a space velocity of 0.1 to about 25 reciprocal hours.

The following examples are meant to illustrate specific embodiments of the invention and not to be limiting.

EXAMPLE 1

A mixture of 50 g of halloysite #13 from the Dragon Iron Mine, Utah, 10 g of attapulgite from Gadsden City, Fla., and 25 g of alumina sol (20 percent Catapal alumina by weight) in 500 ml of water was agitated in a Waring blender for 10 minutes. At this point the slurry mixture had stopped visibly thickening. The slurry was slowly evaporated dry at 110° C. to a thick paste which could be easily extruded. The paste was extruded, and dried and calcined at 500° C.

EXAMPLE 2

The catalyst of Example 1 is tested for absorbance. The absorbance of 550 nanometers (nm) of a solution of asphaltenes dissolved in toluene is followed with time according to the method of Saint-Just (*Ind. Eng. Chem. Prod. Res. Div.*, 1980, 19, '71). The wave length of light chosen has been correlated to concentration of vanadium in solution, which has in turn been correlated to asphaltene concentration. Various catalysts are added. A reduction in the absorbance means that the catalyst preferentially absorbs asphaltene materials from the toluene solution. The results are tabulated in Table I. It can be appreciated that the extruded halloysite/attapulgite mixture adsorbs asphaltenes much better than the extruded halloysite. It has been shown that good demetalation catalysts will always show a marked decrease in the absorbance of the toluene solution when tested in this manner.

TABLE I

| Catalyst Composition | SOLUTION ABSORBANCE AT 550 NM | | | | | |
|---|---|---|---|---|---|---|
| | 0 Min | 5 Min | 10 Min | 15 Min | 20 Min | 30 Min |
| Halloysite with 5% alumina extruded | 1.0 | 0.92 | 0.85 | 0.82 | 0.79 | 0.73 |
| Halloysite 80%, Attapulgite 20 | 1.0 | 0.535 | 0.39 | 0.31 | 0.255 | 0.19 |
| Halloysite 50%, Attapulgite 50% | 1.0 | 0.48 | 0.34 | 0.27 | 0.22 | 0.165 |

What is claimed is:

1. A porous composition of matter comprising codispersed rods of a first fibrous clay and a second fibrous clay, said first fibrous clay having predominantly rods with the length range of 0.5-2 microns and a diameter range of 0.04-0.2 microns and said second fibrous clay having predominantly rods with a length range of 1-5 microns and a diameter range of 50-100 Angstroms.

2. The composition of claim 1 wherein the composition contains at least 5 weight percent of said second clay based on the total weight of said composition.

3. The composition of claim 1 including up to 15 weight percent of a refractory inorganic oxide based on the total weight of said composition.

4. The composition of claim 3 wherein said refractory inorganic oxide is alumina.

5. The composition of claim 1 wherein at least 60 percent of the volume of the pores is present in pores having diameters of 200-700 Angstroms.

6. The composition of claim 1 further comprising at least one metal selected from the transition metals group.

7. A composition of matter comprising codispersed rods of tubular halloysite and fibrous attapulgite.

8. The composition of claim 7 wherein at least 5 weight percent of said composition is attapulgite based on total weight of composition.

9. The composition of claim 8 including up to 15 weight percent of a refractory inorganic oxide based on total weight of composition.

10. The composition of claim 9 wherein said refractory inorganic oxide is alumina.

11. The composition of claim 8 wherein said at least 60 percent of the pore volume is present in pores having diameters of 200-700 Angstroms.

12. The composition of claim 8 further comprising at least one metal selected from the transition group of metals.

13. A method for preparing a porous composition of matter comprising preparing a mixture of a first fibrous clay and a second fibrous clay, said first fibrous clay having predominantly rods with a length range of 0.5-2 microns and a diameter range of 0.04-0.2 microns, and said second fibrous clay predominantly having rods with a length range of 1-5 microns and a diameter range of 50-100 Angstroms; adding sufficient water to create a slurry of no more than 25 weight percent solid content; vigorously agitating the slurry until the slurry ceases to thicken; drying the slurry to create a dry mass; and shaping the dried mass; and calcining the shaped mass.

14. The method of claim 13 wherein said mixture contains up to 15 dry weight percentage of a refractory inroganic oxide bond on total weight of the composition.

15. The method of claim 14 wherein the refractory inorganic oxide is alumina.

16. The method of claim 14 wherein said composition has at least 60 percent of the volume of the pores is present in pores having diameters of 200-700 Angstroms.

17. A method for producing a composition of matter comprising:

preparing a mixture of tubular halloysite and fibrous attapulgite;

adding enough water to create a slurry of no more than 25 weight percent water content;

vigorously agitating the slurry until the thickening of the slurry ceases;

drying the mass, shaping the mass, and calcining the shaped mass.

18. The method of claim 17 wherein the mixture contains up to 15 dry weight percent of a refractory inorganic oxide based on total weight of the composition.

19. The method of claim 17 wherein the refractory inorganic oxide is alumina.

20. The method of claim 17 wherein the mixture contains between 0.1 and 10 weight percent of a catalytic transition metal based on total weight of the composition.

21. The method of claim 17 wherein the calcined mass has at least 60 percent of the pore volume present as pores having diameters between 200 and 700 Angstroms.

* * * * *